United States Patent
Coulmeau et al.

(10) Patent No.: US 10,523,785 B2
(45) Date of Patent: Dec. 31, 2019

(54) QUALITY OF SERVICE OF A FLIGHT MANAGEMENT SYSTEM

(71) Applicant: THALES, Courbevoie (FR)

(72) Inventors: François Coulmeau, Toulouse (FR);
Laurent Castet, Toulouse (FR);
Laurent Deweerdt, Toulouse (FR);
Frédéric Sanchez, Toulouse (FR)

(73) Assignee: THALES, Courbevoie (FR)

( * ) Notice: Subject to any disclaimer, the term of this patent is extended or adjusted under 35 U.S.C. 154(b) by 218 days.

(21) Appl. No.: 14/975,135

(22) Filed: Dec. 18, 2015

(65) Prior Publication Data
US 2016/0182687 A1 Jun. 23, 2016

(30) Foreign Application Priority Data
Dec. 19, 2014 (FR) ..................................... 14 02933

(51) Int. Cl.
*H04L 29/06* (2006.01)
*G06F 9/54* (2006.01)
(Continued)

(52) U.S. Cl.
CPC ............. *H04L 67/42* (2013.01); *G06F 9/54* (2013.01); *H04L 41/14* (2013.01); *H04L 67/10* (2013.01);
(Continued)

(58) Field of Classification Search
CPC ..... G06F 2209/541; G06F 9/54; H04L 41/14; H04L 67/10; H04L 67/325; H04L 67/42
See application file for complete search history.

(56) References Cited

U.S. PATENT DOCUMENTS 5,657,450 A 8/1997 Rao et al.
6,317,659 B1 * 11/2001 Lindsley ................ G06Q 10/10
701/1

(Continued)

FOREIGN PATENT DOCUMENTS

EP 2 600 682 A1 6/2013
WO 03/029968 A1 4/2003

OTHER PUBLICATIONS

VFR Flight, "Free VFR Flight Planner", Oct. 7, 2014, http://vfrflight.org/en/documentation.html.*

(Continued)

*Primary Examiner* — Dhairya A Patel
*Assistant Examiner* — Sandarva Khanal
(74) *Attorney, Agent, or Firm* — Baker & Hostetler LLP

(57) ABSTRACT

A method implemented by computer in or for a flight management system or FMS, comprises the steps of receiving requests issued by clients; determining a correspondence between the requests and predefined unitary services executable by at least one server associated with the FMS; queuing the unitary services determined in one or more queues; determining a response time associated with each request; and notifying at least one client of the response time to its request. Developments describe the processing of queues, the management of priorities, the existence of fixed-price contracts, caching mechanisms, interruptions of queues, cancellations of requests, voting mechanisms, etc. The unitary services in particular can be avionics services of ATA (Air Transport Association) type. Systems aspects and software aspects are described.

22 Claims, 7 Drawing Sheets

(51) Int. Cl.
  *H04L 29/08* (2006.01)
  *H04L 12/24* (2006.01)
(52) U.S. Cl.
  CPC ........ *H04L 67/32* (2013.01); *G06F 2209/541* (2013.01)

(56) References Cited

U.S. PATENT DOCUMENTS

| | | | | |
|---|---|---|---|---|
| 6,339,772 | B1* | 1/2002 | Klein | G06F 16/24568 707/704 |
| 6,574,750 | B1* | 6/2003 | Felber | G06F 11/1474 707/999.202 |
| 6,625,618 | B1* | 9/2003 | Arai | B64F 5/60 |
| 8,082,491 | B1* | 12/2011 | Abdelaziz | G06F 9/465 709/201 |
| 8,332,473 | B1* | 12/2012 | Fouts | H04L 67/2823 709/206 |
| 8,832,302 | B1 | 9/2014 | Bradford et al. | |
| 2003/0088434 | A1* | 5/2003 | Blechman | G06Q 50/22 705/2 |
| 2004/0015368 | A1* | 1/2004 | Potter | H04L 67/10 709/201 |
| 2006/0253621 | A1* | 11/2006 | Brewer | G06F 3/0605 710/40 |
| 2007/0174529 | A1* | 7/2007 | Rodriguez | G06F 13/362 710/240 |
| 2007/0294697 | A1* | 12/2007 | Theimer | G06F 9/5027 718/102 |
| 2008/0070218 | A1* | 3/2008 | Ahl | G09B 5/00 434/322 |
| 2009/0064168 | A1* | 3/2009 | Arimilli | G06F 9/5083 718/105 |
| 2009/0199190 | A1* | 8/2009 | Chen | G06F 9/383 718/102 |
| 2011/0066641 | A1* | 3/2011 | Yang | H04W 76/18 707/769 |
| 2011/0153825 | A1* | 6/2011 | Bello | G06F 9/5038 709/226 |
| 2013/0339759 | A1* | 12/2013 | Doddavula | G06F 1/3206 713/300 |
| 2014/0277656 | A1* | 9/2014 | Nixon | G05B 19/4185 700/95 |
| 2015/0039763 | A1* | 2/2015 | Chaudhary | H04L 47/125 709/226 |
| 2015/0074065 | A1* | 3/2015 | Christ | G06F 3/067 707/692 |
| 2015/0269257 | A1* | 9/2015 | Edlund | G06F 17/30864 707/770 |
| 2015/0372717 | A1* | 12/2015 | Schrum, Jr. | H04B 3/542 370/458 |
| 2016/0080517 | A1* | 3/2016 | Decker | H04L 67/12 709/213 |
| 2016/0170639 | A1* | 6/2016 | Velayudhan | G06F 3/061 711/114 |

OTHER PUBLICATIONS

Kathy Barnstorff, "Cockpit software could help pilots plot best path", Nov. 8, 2013, NASA Langley Research Center, https://www.nasa.gov/aero/cockpit_software_help_pilots.html.*

* cited by examiner

300

| ATA Chapter | Name | French name |
|---|---|---|
| ATA 20 | STANDARD PRACTICES - AIRFRAME | |
| ATA 21 | AIR CONDITIONING AND PRESSURIZATION | Air conditionné et pressurisation |
| ATA 22 | AUTOFLIGHT | Pilote automatique |
| ATA 23 | COMMUNICATIONS | Communications |
| ATA 24 | ELECTRICAL POWER | Génération électrique |
| ATA 25 | EQUIPMENT/FURNISHINGS | Équipements / Ameublement |
| ATA 26 | FIRE PROTECTION | Protection incendie |
| ATA 27 | FLIGHT CONTROLS | Commandes de vol |
| ATA 28 | FUEL | Carburant |
| ATA 29 | HYDRAULIC POWER | Génération hydrauliques |
| ATA 30 | ICE AND RAIN PROTECTION | Protection givre et pluie |
| ATA 31 | INDICATING / RECORDING SYSTEM | Système d'indication / d'enregistrement |
| ATA 32 | LANDING GEAR | Trains d'atterrissage |
| ATA 33 | LIGHTS | Feux de signalisation |
| ATA 34 | NAVIGATION | Navigation |
| ATA 35 | OXYGEN | Oxygène |
| ATA 36 | PNEUMATIC | Pneumatique |
| ATA 37 | VACUUM | Dépression |
| ATA 38 | WATER/WASTE | Eau et toilettes |
| ATA 42 | INTEGRATED MODULAR AVIONICS | Avionique Modulaire Intégrée |
| ATA 45 | DIAGNOSTIC AND MAINTENANCE SYSTEM | Système de diagnostic et de maintenance |
| ATA 46 | INFORMATION SYSTEMS | Système d'information |
| ATA 47 | NITROGEN GENERATION SYSTEM | Système de génération d'Azote |
| ATA 48 | IN FLIGHT FUEL DISPENSING | Ravitaillement en vol |
| ATA 49 | AIRBORNE AUXILIARY POWER | Turbine de génération électrique |
| ATA 50 | CARGO AND ACCESSORY COMPARTMENTS | Compartiment cargo et accessoires |

FIG. 3
PRIOR ART

QUALITY OF SERVICE OF A FLIGHT MANAGEMENT SYSTEM

CROSS-REFERENCE TO RELATED APPLICATIONS

This application claims priority to foreign French patent application No. FR 1402933, filed on Dec. 19, 2014, the disclosure of which is incorporated by reference in its entirety.

FIELD OF THE INVENTION

The invention relates generally to methods and systems for the management of the flight of an aircraft, notably in regard to the determination or prediction of trajectories. The invention relates in particular to onboard systems embedded in avionics systems.

BACKGROUND

Each real-time avionics system is architectured and developed to meet, in a defined framework of employment, performance requirements (for example in regard to RAM, ROM, reset or fault rate, CPU loading and functional Quality of Service or QoS.

Onboard systems are qualified, with a demonstrated performance level, for a given environment. The interactions between onboard systems are defined a priori when devising the architecture of the airplane, and these onboard systems are developed and adjusted to strictly meet the identified needs.

From the standpoint of a client-server perspective, according to which a set of systems termed "CLIENTS" make requests to one or more particular service-provider systems termed "SERVER", there arises notably the technical problem consisting in guaranteeing said clients a certain level of quality of service, for example in regard to precision and response time such as expected by the waiting clients, and to guarantee the proper operation of the whole architecture "N clients and M servers" alongside the updates of the various systems (i.e. by managing a variability and development cycles which differ). The upgrades of a system (client or server) must not cause the set of connected systems to be called into question. Moreover, in an onboard real-time environment, in which the sub-systems have a different criticality level, it is desirable that the critical systems acting as servers be modified as little as possible, having regard to the costs and risks of degradation of said systems.

These technical problems are not currently solved and a requalification is compulsory for the addition of any new system that wishes to connect to an existing system. A new certification or recertification of the airplane is generally required, generating substantial cost overheads. In fact, these systemic aspects (involving overhauls of the architecture of the servers and of their interfaces and therefore requalification costs) currently curb the upgrading of airplane operations.

In practice for example, if a client needs a Quality of Service (QoS) of a certain level (such as for example an expected limit response time), and the server needs more time to perform its calculation, the consequence which ensues is that the client will have to wait. In certain alternative configurations, the server may decide to cancel the client's request if the necessary calculation time is greater than the response time requested by the client. This type of configuration is however not acceptable in certain situations, notably in the case of onboard real-time systems which require a response within the allowed times to ensure their proper operation. For example, notably within the framework of "open" architectures where an a priori unknown number of clients connects in an asynchronous and random manner to a server with limited calculation capabilities, the existing solutions will in the best case deny overly numerous requests, or in the worst case respond too often and/or too late, endangering the overall architecture of the system.

The approaches known in the prior art generally consist in requalifying the equipment affected or impacted by a new connection (even with constant functionalities), so as to verify adherence in regard to performance. Avionics architectures are therefore defined statically, during the design of the airplane system. The patent literature does not provide any satisfactory solution to the technical problem. For example, patent document U.S. Pat. No. 8,832,302 entitled "System and method for a priori scheduling of network services" describes a system for ad hoc networks comprising mechanisms for recognizing services. This approach structured by services and not by data exhibits limitations.

An industrial need exists for methods and systems corresponding to flexible and adaptable architectures making it possible notably to ensure the upgradability of the various client and server systems in an independent manner, while guaranteeing clients a level of quality of service which is guaranteed.

SUMMARY OF THE INVENTION

There is disclosed a method implemented by computer in (e.g. "integrated into") and/or for ("associated with") a flight management system or FMS, comprising the steps consisting in receiving requests issued by clients; determining a correspondence between the requests and predefined unitary services executable by at least one server associated with said FMS; queuing the unitary services determined in one or more queues; determining a response time associated with each request; and notifying at least one client of the response time to its request. Developments describe the processing of queues, the management of priorities, the existence of fixed-price contracts, caching mechanisms, interruptions of queues, cancellations of requests, voting mechanisms, etc. The unitary services in particular can be avionics services of ATA type (the acronym standing for "Air Transport Association"). Systems aspects and software aspects are described.

According to one aspect of the method according to the invention, the service provider is segmented or separated or delimited into three sub-parts: a) the numerical calculation core called the "CORE", which offers unitary calculation services; b) a "SEP SERVER" for "Separated Server" comprising a "SERVER CORE" which is a layer for transcribing the requests of the CLIENTS into unitary services of the core and c) a "SERVER FRONT END" which is a layer for dialog with the "CLIENTS", managing notably the requests of the various clients (acceptance logic, priority, filtering etc.).

According to one aspect of the invention, the server (the "SERVER FRONT END") will make it possible to decouple the aspects of management of the QoS for "CLIENTS" in an upgradable environment while relying on a stable core "CORE" which basically supports the capability to manage any number (limited only by the resources available) of clients while continuing to fulfill its basic mission while adhering to the associated performance requirements. In this manner, the problems of variability of the CLIENTS are isolated from those relating to the CORE. The robustness of the CORE remains guaranteed since the code for managing the clients and for managing the variability of the interfaces is managed by the "SERVER FRONT END" and "SERVER CORE".

In certain embodiments, the adaptive "SEP SERVER" system mentioned previously is configurable on startup ("at start time") or indeed during execution ("at runtime", i.e. dynamic configuration during execution). For example, on startup, the system reads a configuration table which describes the topology of the clients present and the list of "CORE" services available, with their characteristics. The "SEP SERVER" system then self-configures so as to reserve the necessary resources.

According to one aspect of the invention, an embodiment of the method creates a "SEP SERVER" isolated from the "CORE", and configures this "SEP SERVER" by establishing i) the characteristics in terms of quality of unitary service of the services offered by the "CORE"; ii) the correspondence between the requests of the "CLIENTS" and the unitary services of the "CORE" or of the "COREs" suitable for executing them; iii) the correspondence between the results of the unitary services of the "CORE" and the results expected by the client; iv) the scheduling of the requests of the various "CLIENTS" on the "CORE" or the "COREs" suitable for processing them.

Advantageously, an embodiment of the method according to the invention makes it possible to decouple the upgrades of the service providers "CORE" and of the clients "CLIENTS", thereby ensuring upward compatibility and control of the requalification of the set of systems.

Advantageously, an embodiment of the method according to the invention makes it possible to preserve the intrinsic performance of the "CORE" without having to ascertain a priori the exterior clients, while guaranteeing the clients in question a calculation result with the required quality of service.

Advantageously, an embodiment of the method according to the invention makes it possible to put in place mechanisms for pooling and/or functional historization based caches and for optimizing the calls to the core services. This aspect makes it possible notably to manage the obsolescence of the data of the cache to be determined versus the data recalculation time. The notion of cache is all the more relevant when dealing with consulting big data or subset of big data (for example active FPLN and its associated trajectory for a Flight Management System or FMS).

Advantageously, an embodiment of the method according to the invention, via the creation of an "intermediate" system, makes it possible to best adjust the distribution of the clients' requests to the "CORE" service providers, for example as a function of the configuration loaded (e.g. number, type and performance of the services).

Advantageously, an embodiment of the method according to the invention makes it possible to minimize the rate of refusal of client requests.

Advantageously, an embodiment of the method according to the invention makes it possible to control the allocation of the calculation time to third-party clients in a guaranteed manner.

Advantageously, an embodiment of the method according to the invention makes it possible to be able always (or practically always) to give a reliable prior response accepting and/or refusing handling of the request, accompanied optionally by a status notification about the Quality of service (e.g. response time, precision, reliability) which will stem from the calculation. In a variant embodiment, a FRONTAL server can be implemented on one of the cores, while the other cores have an equivalent partition which hosts a calculation resource (for example FRONTAL server on FMC1 and NAVDB SERVER on FMC2). According to another variant, it is also possible to implement a single FRONTAL; the frontal server being able to interrupt the calculation of a client so as to toggle to another (e.g. pause/resume mechanism), so as to manage the priorities (for example in relation to deadlines).

Advantageously, according to certain implementations of the invention, the functional cache can make it possible to "smooth" the loading of the cores CORE; it may be predictive (optionally) but also a historization based functional cache. Isolation within one or more different partitions makes it possible to upgrade these caching processes so as to render them ever more "intelligent" (c.f. automatic filling mechanisms or "auto-completions").

Advantageously, the methods according to the invention are generally compatible with the notion of DIA (for "Domain Interaction Agent"). Instead of scattered clients that address themselves directly to the "server" system, an interface can concentrate the queries and make the requests to the services afforded by the "server".

The method according to the invention determines or delimits or creates or specifies or defines a "SEP SERVER", which is a module separated functionally from the "CORE". For each service, there is determined a "calculation time" function for the service. When said service is invoked by a client to perform a calculation, the method determines the CPU calculation time necessary "without adjustment" and compares it with a response time objective. A calculation time objective is determined so as to be able to respond to the clients a given response time (the server being able to be called by multiple clients, and being able likewise to perform its own calculations). Said response time objective can be determined by the client and/or be determined by the server. In certain variants, the client has the capability to confirm or to cancel its request. Optionally, an embodiment of the method according to the invention can manage the history of the recurrent commands or requests (i.e. functional caching).

Advantageously, an embodiment of the method according to the invention makes it possible to decouple the upgrades of the service providers "CORE" and of the clients "CLIENTS", thereby ensuring upward compatibility and control of the requalification of the systems as a whole. The problems of variability of the CLIENTS are therefore isolated from those relating to the CORE. The clients do not need to ascertain the overall system architecture, the list of available cores or the list of unitary services and their scheduling in order to carry out a request. Everything is handled by the intermediate layer "SEP SERVER".

Advantageously, an embodiment of the method according to the invention makes it possible to manage the variability of the "system of systems". For example relating to the management of the clients: the priorities being managed by the "SERVER FRONT END", different algorithms can be implemented according to the needs of the clients.

Advantageously, an embodiment of the method according to the invention makes it possible to preserve the intrinsic performance of the "CORE" without having to ascertain a priori the exterior clients, while guaranteeing the clients in question a calculation result with the required quality of service. The expression "intrinsic performance" is understood to mean or intended to refer to the performance in regard to CPU and RAM/ROM as well as in regard to reliability (that a given system must fulfill within the framework of an architecture laid down a priori to meet the safety requirements and ensure an overall operation). This architecture being defined a priori (i.e. with identified services and/or identified exchanges of data), it becomes possible to add new interactions without having to modify these services and data. The robustness of the "CORE" remains guaranteed since the algorithms—sometimes complex for management of the clients and correspondences of interfaces—are managed outside of the "CORE", i.e. by the "SEP SERVER".

Advantageously, the invention is applicable to any architecture of embedded real-time systems (aeronautical, automobile, medical etc.) involving a plurality of clients, one or more software applications (for example for flight management) and a plurality of units providing services (for example numerical "cores").

Advantageously, the distributed system according to the invention allows the addition of new connections (i.e. of new "CLIENTS") to the service-provider real-time system called the "SERVER", while guaranteeing them a quality of service corresponding to the expectations of the client system. Generally, proper operation of the overall system is allowed, which does not degrade its performance and does not give rise to software or hardware modifications of said "SERVER". The addition of a new client, of a new service provider, or of a new connection or of a client, then gives rise only to a requalification of the other clients/servers. The performance of the system of systems is maintained in accordance with the initial requirements.

DESCRIPTION OF THE FIGURES

Various aspects and advantages of the invention will become apparent in support of the description of a preferred but nonlimiting mode of implementation of the invention, with reference to the figures hereinbelow:

FIG. 3 illustrates the structuring of a system of systems according to the ATA standard;

DETAILED DESCRIPTION OF THE INVENTION

Certain technical terms and environments are defined hereinafter.

The pilot of an aircraft or airplane uses the flight plan information in several contexts: within the avionics equipment by means of the FMS (Flight Management System) and/or by means of an "EFB" (Electronic Flight Bag), for example of tablet type.

The acronym (or initials) EFB corresponds to the conventional terminology "Electronic Flight Bag" and refers to onboard electronic libraries. An EFB ("electronic flight bag" or "electronic flight tablet") is a portable electronic device used by flight personnel (for example pilots, maintenance, cabin, etc.). Various classes of EFB hardware exist. Class 1 EFBs are portable electronic devices (PED), which are not normally used during takeoff and disembarkation operations. This class of device does not require an administrative process for particular certification or authorization. Class 2 EFB devices are normally disposed in the cockpit, e.g. mounted in a position where they are used during all flight phases. This class of devices requires prior usage authorization. Class 1 and 2 devices are considered to be portable electronic devices. Fixed installations of class 3, such as computer media or fixed docking stations installed in the cockpit of aircraft, generally necessitate approval and certification on the part of the regulator.

The acronym (or initials) FMS corresponds to the conventional terminology "Flight Management System" and refers to the flight management systems of aircraft. During flight preparation or when rerouting, the crew undertakes the input of various items of information relating to the progress of the flight, typically by using an FMS aircraft flight management unit. An FMS comprises input means and display means, as well as calculation means. An operator, for example the pilot or the copilot, can input via the input means information such as RTAs, or "waypoints", associated with route points, that is to say points vertically in line with which the aircraft must pass. The calculation means make it possible notably to calculate, on the basis of the flight plan comprising the list of waypoints, the trajectory of the aircraft, as a function of the geometry between the waypoints and/or of the conditions of altitude and of speed.

The acronym MMI corresponds to Man-Machine Interface (or HMI, Human Machine Interface). The input of the information, and the display of the information input or calculated by the display means, constitute such a man-machine interface. Generally, the MMI means allow the input and the consultation of the flight plan information, piloting data, etc.

Figure 1:
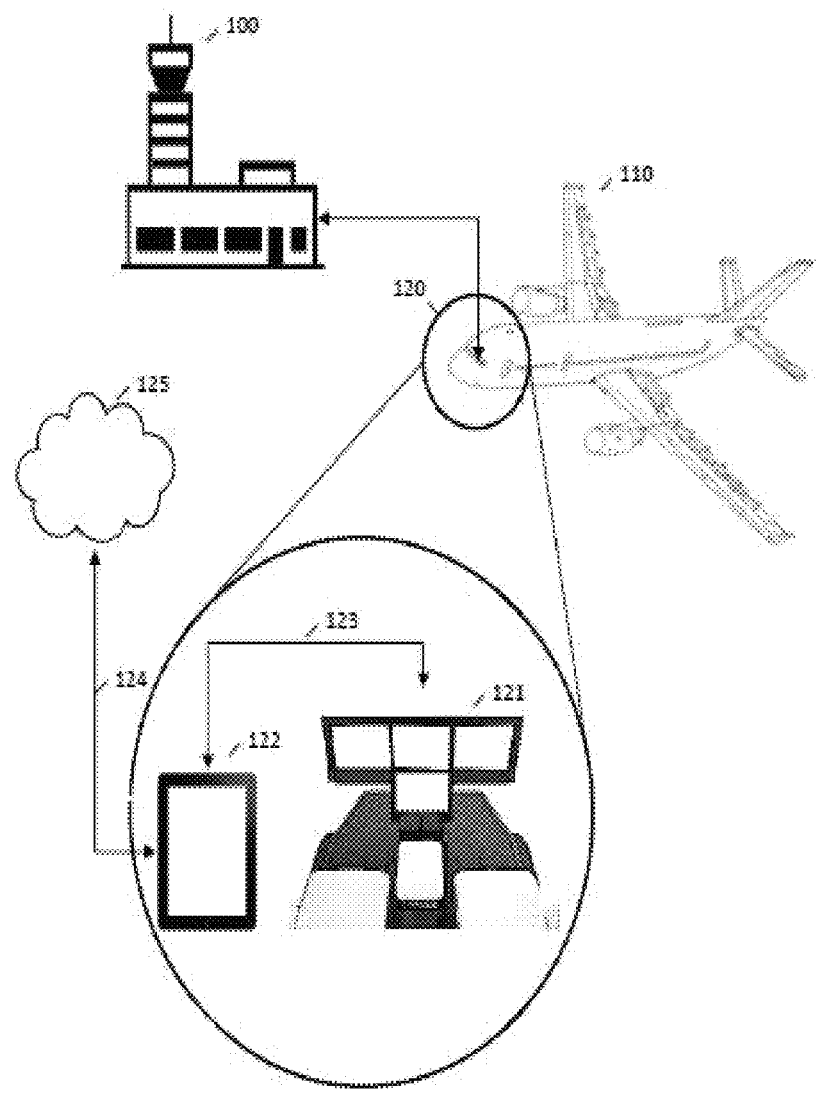
FIG. 1 illustrates the overall technical environment of the invention.

FIG. 1 illustrates the overall technical environment of the invention. Avionics equipment or airport means 100 (for example a control tower linked with the air traffic control systems) are in communication with an aircraft 110. An aircraft is a transport means capable of deploying within the terrestrial atmosphere. For example, an aircraft can be an airplane or a helicopter (or else a drone). The aircraft comprises a flight cabin or a cockpit 120. Within the cockpit are situated piloting equipment 121 (so-called avionics equipment), for example comprising one or more onboard processors (means of calculation, storage and saving of data), including an FMS, means of display or visualization and input of data, communication means, as well as (optionally) haptic feedback means. An EFB 122 may be situated aboard, in a portable manner or integrated into the cockpit. The said EFB can interact (bilateral communication 123) with the avionic equipment 121. The EFB can also be in communication 124 with external computing resources, accessible through the network (for example cloud computing 125). In particular, the calculations can be performed locally on the EFB or partially or totally in the calculation means accessible by the network. The onboard equipment 121 is generally certified and regulated while the EFB 122 and the connected computing means 125 are generally not (or to a lesser extent). This architecture makes it possible to inject flexibility on the EFB 122 side by ensuring controlled safety on the onboard avionics 121 side.

Figure 2:
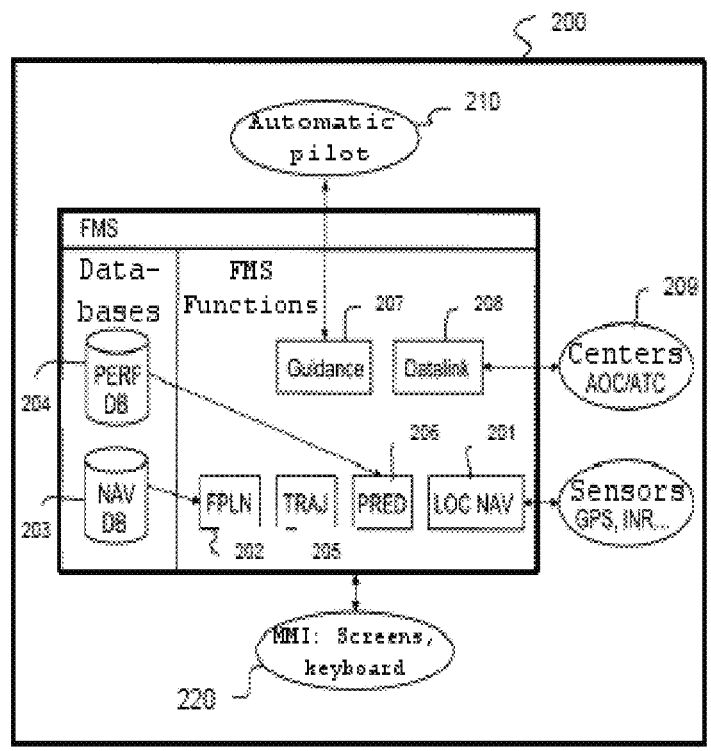
FIG. 2 schematically illustrates the structure and the functions of a flight management system of known FMS type.

FIG. 2 represents an FMS employing functions described in the ARINC standard. In a generic manner, an FMS refers to any system or set of systems making it possible to manage the route/trajectory of an airplane/aircraft (independently of the variants of physical implementation). A flight management system within the meaning of the invention FMS can correspond to various hardware implementations and/or software implementations. In the known prior art, an FMS currently refers to a specific processor, the perimeter of which is illustrated in FIG. 2. However, other architectures are entirely possible: an FMS can correspond to a single server or else to a plurality of servers (working in a centralized manner and/or in a distributed manner). The expression "at least one server associated with the FMS" therefore refers generally to access to the hardware and/or software resources of the entity making it possible to ensure the functions described presently.

A system of FMS type 200 is generally disposed in the cockpit 120. The FMS is associated with avionics means 121 and with one or more man-machine interfaces 220 comprising inputting means, for example formed by a keyboard, and display means, for example formed by a display screen, or else simply a touch-sensitive display screen.

An FMS generally comprises the following functions:

Navigation (LOCNAV) 201, for performing optimal location of the aircraft as a function of the geolocation means such as geo-positioning by satellite or GPS, GALILEO, VHF radionavigation beacons, inertial platforms. This module communicates with the aforementioned geolocation facilities;

Flight plan (FPLN) 202, for inputting the geographical elements constituting the "skeleton" of the route to be followed, such as the points imposed by the departure and arrival procedures, the waypoints, the "airways";

Navigation database (NAVDB) 203, for constructing geographical routes and procedures on the basis of data included in the bases relating to the points, beacons, interception or altitude legs, etc.;

Performance database, (PERFDB) 204, containing the craft's aerodynamic and engine parameters;

Lateral trajectory (TRAJ) 205, for constructing a continuous trajectory on the basis of the points of the flight plan, complying with the performance of the aircraft and the confinement constraints (RNP);

Predictions (PRED) 206, for constructing an optimized vertical profile on the lateral and vertical trajectory and giving the estimations of distance, time, altitude, speed, fuel and wind notably on each point, at each change of piloting parameter and at destination, and which will be displayed to the crew. The methods and systems described affect or relate mainly to this part of the processor;

Guidance (GUID) 207, for guiding in the lateral and vertical planes the aircraft on its three-dimensional trajectory, while optimizing its speed, with the aid of the information calculated by the Predictions function 206. In an aircraft equipped with an automatic piloting facility 210, the latter can exchange information with the guidance module 207;

Digital data link (DATALINK) 208 for exchanging flight information between the Flight plan/Predictions functions and the control centers or other aircraft 209;

One or more screens, notably the so-called FMD, ND and VD screens.

On the basis of the flight plan defined by the pilot (list of waypoints), the lateral trajectory is calculated as a function of the geometry between the waypoints (customarily called LEGs) and/or the altitude and speed conditions (which are used for the calculation of the turning radius). On this lateral trajectory, the flight management system FMS optimizes a vertical trajectory (in terms of altitude and speed), passing through possible altitude, speed, time constraints.

FIG. 3 illustrates the structuring of a system of systems according to the ATA standard (the acronym standing for "Air Transport Association"), according to aircraft manufacturers' practices.

Each real-time avionics system is architectured and developed to meet performance requirements (in regard to RAM, ROM, fault rate, CPU and functional QoS) determined in a defined framework of employment. In this architecture, each system is connected to other systems. Each system consumes data and services made available by these other systems and produces data and services for the other systems. These systemic interactions are generally defined in a static manner when devising the overall architecture of the "system of systems", i.e. when allocating the operational functions to the various physical systems making up the overall system. Thus, it is frequent in the avionics world to have several tens of systems meeting the airplane functions as a whole.

Typically, airplane operations are allocated to the systems according to a logical structuring, defined in the standardization document of the "Air Transport Association" (ATA). The ATA system 300 comprises chapters 310 which make it possible to group the aeronautical systems together under rubrics. FIG. 3 provides examples of such chapters 310 as well as their denomination in English 320 and in French 330. The various denominations are common in respect of the various aeronautics players such as engineering, maintenance and servicing, pilots as well as in respect of the flight manuals (this generally being so for all aircraft manufacturers).

Thus, the airplane architecture is itemized into collaborative avionics systems, each having a well determined function, and interactions with the other systems to render the expected operational service. These functions are distributed over several physical processors, according to the specific choices of the various aircraft manufacturers, so as to guarantee performance. Onboard systems are qualified, with a demonstrated performance level, for a given environment. The guarantee of the overall operation of the "system of systems" generally ensues from a so-called "worst case" analysis (the systems are loaded to the maximum and the functioning of the operation is verified in relation to operational requirements). Statistical techniques can also be used. In these techniques, analyses of "black box" type can be conducted relating for example to the effect of the response times of each system on overall operational performance, aiming at a failure probability of less than one or more predefined thresholds. Occurrence thresholds for an operation having catastrophic consequences (i.e. with losses of human lives) at $10^{-9}$ per flight hour are for example aimed at in aeronautics. These probabilistic techniques make it possible to assign requirements in regard to response time and probability of adherence to these requirements to each system, so as not to exceed the threshold probability of $10^{-9}$.

Figure 4:
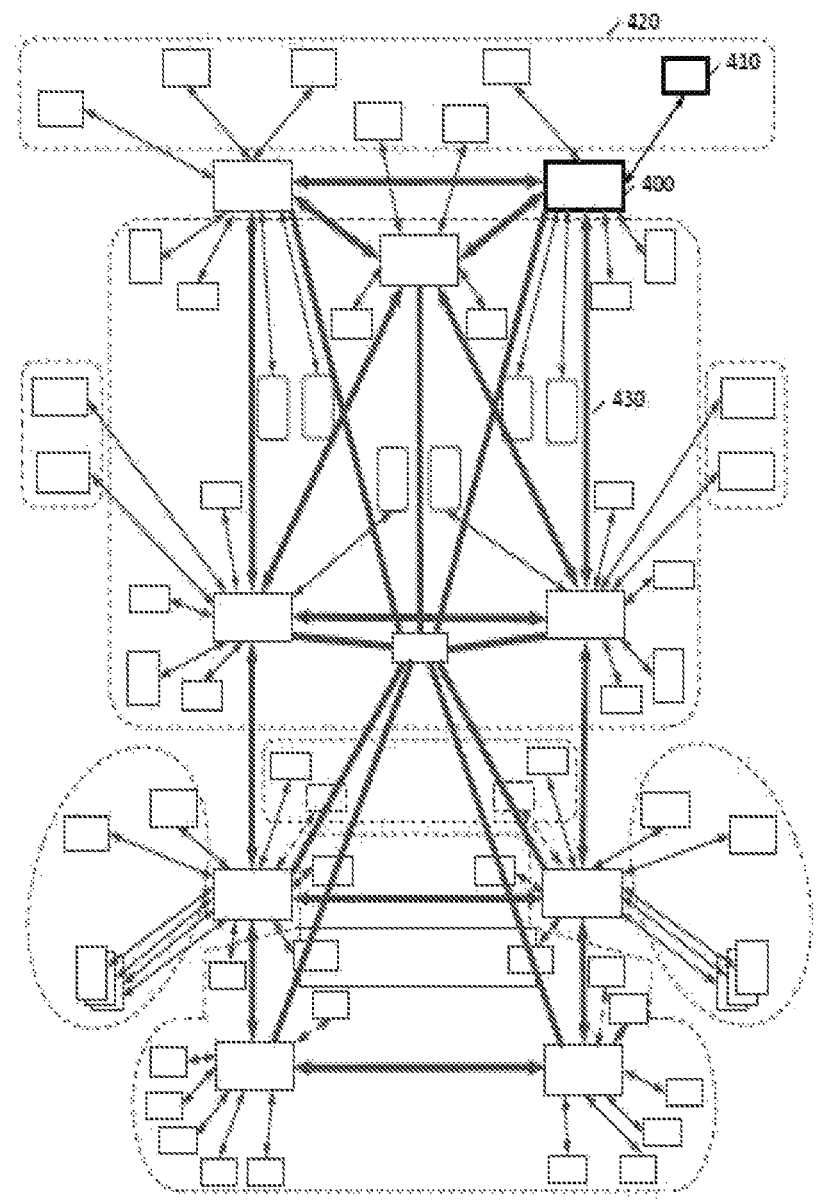
FIG. 4 illustrates an exemplary ATA architecture.

FIG. 4 illustrates an exemplary ATA architecture. Various ATAs are distributed over physical systems (processors), for example 410, 420 and 430. The interactions between systems are defined a priori when devising the general architecture, and the systems are developed and adjusted to meet the strict need of the interactions, i.e. the clients of a system are well identified, the industrial parties develop the functions allocated to their system, which comply with the expected performance within the strict framework of employment defined a priori: stated otherwise, all the clients are known and no new client can interact with the system without requalification of the whole. In this systemic framework, the probability of non-adherence to the performance of each system is specified, so as to guarantee that the probability of non-adherence to the overall performance remains below a predefined safety threshold.

The boxes of type 400 are network concentrators (called "switches" in the so-called ARINC653 version of the airplane network). All the processors (for example 410 and 420) are connected to a "switch" (e.g. generally with redundancy of the availability reasons) and dialog with the other processors on the network (for example 430).

A technical problem which arises resides in the fact that the addition of a new system to a given "system of systems" may engender an expensive requalification (it is necessary to again demonstrate adherence to the overall operational performance and to reallocate the performance of the "server" systems), and may do so even when no new service is expected by the "server" system.

Figure 5:
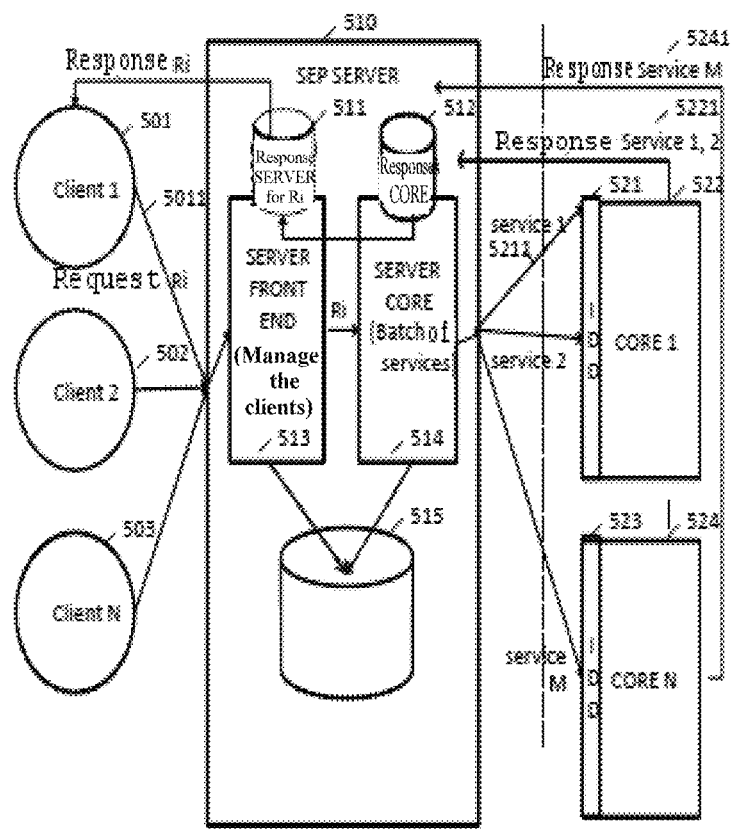
FIG. 5 shows an exemplary architecture according to an embodiment of the method according to the invention.

FIG. 5 shows an exemplary architecture according to an embodiment of the method according to the invention.

In the example which is illustrated the service provider "SERVER" is split into two: a) an intermediate "SEP SERVER" 510 between the client systems called "CLIENTS" (501, 502, 503) and one or more calculation systems or cores of unitary services called "CORE" (522,524). The calculation cores of unitary services aim to guarantee the intrinsic performance of the "CORE" (i.e. to arrange to safeguard the mission of the "CORE" outside of the "CLIENTS"), while affording the clients calculation resources with a guaranteed quality of service and also guaranteeing the independence of the development cycles between the "CLIENTS" and the "CORE".

The "SEP SERVER" system 510 is an adaptive system, according to various schemes. It may be configurable "at design time", at "start time" and/or "at runtime". The expression "at design time" signifies that the number of clients, the times and also the associated services are determined at the moment of design. This approach exhibits limitations in terms of possibilities of maintenance and upgradability. The expression "at start time" signifies that on startup the system reads a configuration table, for example "SERVER BDD" which describes the topology of present clients, and reads the list of "CORE" services available (with their characteristics). The expression "at runtime" signifies that the method furthermore comprises one or more steps aimed at satisfying one or more clients and/or the associated adaptation mechanisms (for example in real time).

In a variant embodiment, in order to guarantee the intrinsic performance of the "CORE" system, a "Domain of use" may be defined, in which the configuration can be authorized.

Generally, the "SEP SERVER" is a system which self-configures so as to reserve the necessary resources. In particular embodiments, the configuration of the "SEP SERVER" can result from external actions.

According to one aspect of the invention, a "SEP SERVER" is isolated from the "CORE" and this "SEP SERVER" is configured by establishing notably one and/or the other of the following analyses: i) the characteristics in terms of quality of unitary service of the services offered by the "CORE"; ii) the correspondence between the requests of the "CLIENTS" and the unitary services of the "CORE" or of the "COREs" suitable for executing them; iii) the correspondence between the results of the unitary services of the "CORE" and the results expected by the client; iv) the scheduling of the requests of the various "CLIENTS" on the "CORE" or on the "COREs" suitable for processing them; v) the management of a functional cache so as to preserve the results estimated as potentially reusable over a long duration.

In a variant embodiment (optional), the "SEP SERVER" 510 comprises two separate elements: 1) a "SERVER FRONT END" 513 (which can also be called the "FRONTAL"); this server manages the incoming streams of requests of the clients (priority, filtering, feasibility of the calculation in the desired QoS) and invokes the "SERVER CORE" or the "CORE" and 2) a "SERVER CORE" 514 (which can also be called the "WRAPPER"); this server, in the case of complex requests, transforms the requests into "batches" of services IDD (521 for the CORE 1 522; and 523 for the CORE N 524) of the "CORE" and commands the execution of said services IDD on the "CORE". The advantage of this variant embodiment resides in the fact of isolating the variability between the technology of "prioritization" of the clients (that can call upon complex logic and algorithms) and the "management of the interfaces" part. In the situations where the clients make direct use of the list of services of the "CORE", this "SERVER CORE" is not necessary.

In the example of FIG. 5, a client 1 501 formulates a request 5011 which is received by the FRONTAL server 513 and then transmitted to the SERVER CORE 514 (after verification of its eligibility for example via a database 515, which consolidates data comprising for example: the CPU time of the unitary services (including the Server), a matrix or arrays of request/batch of services, a service data formatting matrix, a list of execution resources (e.g. by request, with precedence, independence, parallelization, etc.), one or more client priorities, etc.). The SERVER CORE 514 thereafter addresses in an appropriate manner one or more services IDD (for example the "service 1" 5211 which invokes the CORE 1 522 for example via an access to the list of unitary services IDD 521; and the "service M" 5241 which invokes the CORE N 524 for example via an access to the list of unitary services IDD 523). At output, the response of the Service 1 5221 is returned to the SEP SERVER (firstly the CORE responses 512 and then the responses of the FRONTAL 511) and finally the response 1 is returned to the client 1 501.

Figure 6:
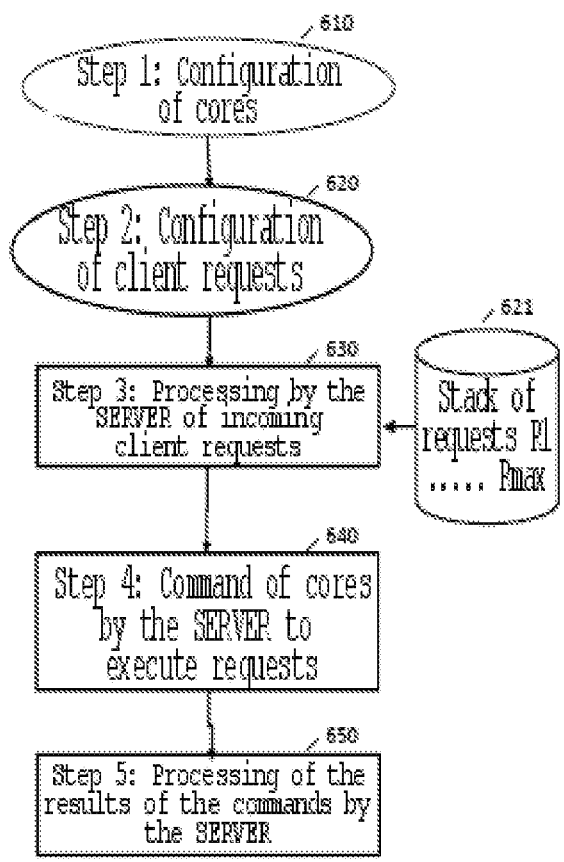
FIG. 6 illustrates examples of steps of the method according to the invention.

FIG. 6 illustrates examples of steps of the method according to the invention.

In a first step 610, the cores (CORE) are configured. Generally, this step consists in structuring the "SERVER BDD" element 515. The configuration can be done in a prior manner or "Offline" by an operator (for example according to the configuration of the cores CORE and Clients, such as is known from the overall architecture of the system). In "Plug and play" variant embodiments, on startup the "SEP SERVER" can read, for example on the network of the onboard system, the list of cores "CORE" and their characteristics in terms of quality of service (QoS), so as to structure in real time the "SERVER BDD" configuration file.

In a first sub-step 6.1, the method can create a first table "T_CORE" containing the list of service-provider numerical cores "CORE" "Ki" ($i=1 \ldots nb\_core$). In a particular embodiment, nb_core may be equal to the value 1. In other embodiments the variable nb_core is strictly greater than the value 1. In a second sub-step, for each "CORE" Ki, the method can create a second table "T_Ki_Services" containing the list of unitary services "S(Ki, j)" offered by the core Ki, $j=1 \ldots nb\_services(Ki)$. In a variant embodiment, a matrix can be determined, which matrix comprises the cores Ki according to one dimension and the services S according to another dimension. Other mathematical formalizations are possible. In a third sub-step, for each service S(Ki,j), the method creates a QoS "Quality of service" table T_Qos_S (Ki,j), of said unitary service S(Ki,j), dependent on the capabilities of the core Ki. For example, said table can contain the CPU characteristics of the core such as the time available per MIF for the service S(ki,j). Optionally, the QoS table can comprise the RAM/ROM Memory characteristics of the core for the service S(ki,j). Optionally, the QoS table can comprise the characteristics in regard to calculation precision for the service S(ki,j) (comprising for example the number of iterations for the iterative calculations, the integration step size for the numerical integrations, the thresholds for the calculations involving tolerances, the quality of the basic mathematical libraries, the precision of the floating numbers used, etc.). These characteristics can be frozen (static) or parametrizable (the QoS is then variable). Optionally, the QoS table can comprise characteristics relating to the reliability of the calculation (such as for example the level of development of the processor hosting the "CORE"). For onboard real-time systems, this reliability may for example be manifested under the acronym "DAL" defined by the RTCA DO178B standard, which makes it possible to ascertain the probability of failure of a calculation chain (e.g.: level C=$10^{-5}$/hour, level=$10^{-7}$, level B=$10^{-9}$ etc.). The reliability can be expressed as the probability of erroneous calculation for each service S(Ki,j).

Moreover, the services of the "COREs" accessible to the clients being qualified since they generally form part of the onboard code, the Quality of service can be defined a priori notably for the aspects of precision and reliability of calculations (depth of the integrations, etc.), for the aspects associated with the response times and for the aspects associated with the memory available for the client (number of elements calculated).

In a second step 620, the requests of the "CLIENTS" are configured. In a first sub-step, the method creates a table of the client requests "T_requests" which factorizes the requests R(k) (k=1, nb_requests) of the various clients C(m) (m=1 . . . nb_clients). This step can be carried out in a prior manner offline, by an operator, for example after analysis of the various requests made by the clients. In a "Plug and play" alternative, on startup the "SEP SERVER" can read, on the network of the onboard system, the list of clients "CLIENTS" and their characteristics in terms of requests so as to structure the "SERVER BDD" configuration file in real time.

In a first embodiment, the table contains the requests R(k) independently of the structure of the clients. A new client can then advantageously connect and use the existing requests, without modifying the SERVER BDD configuration file. In a variant embodiment, for each request R(k), the table can associate the clients C(m) which use it. A matrix can be determined, for example. Advantageously, the SEP SERVER statically knows on startup the list of potential clients, and therefore all the possible requests; it can also manage priorities and "fixed-price contracts" which can vary according to the clients.

In a second sub-step, for each request, the method creates a correspondence matrix ReqServ, for the match between the client operational requests and a batch of unitary services "S(*,j)" offered by the "CORE" service providers (the notation "*" indicates that the correspondence does not depend on the core but on the typology of the unitary services). In a "single-core" environment, the matrix therefore contains the correspondence between each client complex request R and the succession of services S(K1,j) to be executed to carry out the request. In a "multi-core" environment, the request will advantageously be able to be distributed over several cores, to profit from the parallelism, for example, or the fastest cores. The matrix S also contains the order of execution of the services so as to carry out the request R(k). For each request R(k), the method determines the commands COM(S(*,j), n) n=1 for the service to be executed first. In one embodiment, a value of "n" which is identical for 2 services of a request signifies that they are parallelizable. In a particular embodiment, the matrix contains only a list of "simple" requests corresponding to the unitary services (bijection). This allows the CLIENTS to access the unitary services of the core directly.

In one embodiment, the matrix contains the list of "simple" requests corresponding to the unitary services and the list of complex requests corresponding to a batch of unitary services. This variant allows the CLIENTS to access the unitary services of the core and to perform complex requests. This variant is advantageously flexible. For the simple unitary services, the "CLIENTS" themselves use the unitary services available via the first step to manage their requests, not by direct call of the service (i.e. to manage the variability of the cores) but by call of an intermediate request reformatted by virtue of the matrix REQ_SERV. For the complex requests, the server knows and executes the "batch" of unitary services. This approach avoids several disadvantages and limitations (no updating of the code of the clients when the unitary services vary; no necessity to ascertain the operation of the cores (i.e. of what exactly the service is carrying out functionally) nor even the dynamics of the operation of these cores (i.e. which is the authorized stringing together of the unitary services, which are the data to be reused/modified from one unitary service call to another call, etc.).

In a third sub-step, for each request, the method creates a structure matrix of the response to the client T_Rep(R(i)), containing the list of values expected at output. In one embodiment, the unitary data (arising from the command batch of the second sub-step) are simply filtered and shaped (units, format of the floating numbers, rounded etc.). In one embodiment, the unitary data arising from the batch of commands are processed mathematically to reconstruct the response. The processing can include arithmetic, trigonometric, functional or logical operators. These rules will be used subsequently to format the response to the client. In a variant embodiment, the method creates a matrix comprising the cores Ki on one dimension and the services S on another dimension and the QoS on the other dimensions, and the correspondence matrix on other dimensions. Other mathematical formalizations are possible (functions instead of tables for example).

In a third step 630, the "SEP SERVER" processes the requests emanating from the "CLIENTS".

In a first sub-step, a request R(i) of a "CLIENT" C(k) is received by the "SEP SERVER". The "SEP SERVER" (or its "SERVER FRONT END" part) analyzes the handling of the request. If the latter does not form part of the list of managed requests, which is stored in the T_Requests table of the "SERVER BDD" 515, then an error message can be communicated together with a notification of denial of the request of the client. Optionally, if the client is not declared or if the request is not authorized for this client, the request can be denied, for example within the framework of a T_Requests table containing the requests and the clients. Optionally, a variant embodiment can implement a client "fixed-price contract" mechanism (e.g. for example analogous to the operation of a capped fixed-price telephone contract): if a client has consumed all their requests in a given time, a denial notification can be issued. Optionally, a variant embodiment can implement a mechanism for filtering the clients that over-consume the service by considering one or more predefined thresholds). For example, if a client makes more than N requests in a given time interval, one or more denial notifications can be issued. Optionally, in a variant embodiment, if the maximum number of requests that can be managed or dealt with by the "SEP SERVER" is reached (621—stack of requests R1, . . . Rmax), the request R(i) can be denied (otherwise, the request will be accepted).

In a first alternative sub-step (variant embodiment), use is made of the consultation of the "functional cache": if the item of data expected by the client is available and still valid, the other steps are not carried out and the method continues directly to the fifth step. The functional cache can be a "predictive cache": it contains data calculated periodically by the "SEP SERVER" (i.e. without being invoked by a client, for example as a function of the analysis of the recurrent requests). The functional cache can also be a "historization cache": it can preserve in memory certain results of already executed requests, as long as the latter are not obsolete, so as to be able immediately to return the result to a client that might make the same request a little later.

In a second sub-step, the "SEP SERVER" (or its "SERVER FRONT END" part) interrogates the "SERVER BDD" to determine the correspondence or "mapping" between the request R(i) and the batch of unitary services of the core(s) "S(*,j) by virtue of the matrix REQ_SERV. In a third sub-step, the "SEP SERVER" (or its "SERVER FRONT END" part) interrogates the SERVER BDD to ascertain the list of cores "CORE 1" . . . "CORE N" which are able to execute at least one of the services (and/or use may be made of the consultation of the functional cache (according to modalities identical to those described previously). In a fourth sub-step, the "SEP SERVER" (or its "SERVER FRONT END" part) interrogates the SERVER BDD to ascertain the Quality of Service (in particular the response time of each core for each service). It deduces therefrom the response time of the request which is the sum of the response times of the unitary services on the core Tu(S(k,j), K(k)), and of the processing time of the "SEP SERVER" Tu(R(i),SEP SERVER) itself after having also reckoned the response time of the requests already pending on this core. Optionally, for the parallelizable services in a "multi-core" environment, the calculated response time deducts the response times of the parallelizable services (for 2 parallelizable services, the time of the longer service is selected). In a variant embodiment, the "SERVER CORE" is in charge of reducing the response time by undertaking the parallelization of the calculations during execution. Optionally, in a "multi-core" environment, the "SERVER FRONT END" can optimize the response time by choosing the cores which respond the quickest, for example according to the Quality of Service in terms of required response time. In a variant embodiment, the "SERVER CORE" is in charge of reducing (e.g. still more) the response time by choosing the cores, during execution. Optionally, in a "single-core" environment, if the QoS of the services is parametrizable, the FRONTAL can determine a unitary QoS to meet an overall QoS of the request (in regard to precision, reliability, limit response time, etc.). As a function of the results (i.e. by comparing the achievable QoS and the required QoS), the "SERVER FRONT END" can accept or deny the request. In a fifth sub-step (optional), the "SEP SERVER" (or its "SERVER FRONT END" part) can reconsider the ongoing requests present in the processing stack, to take into account a request whose response time does not enter (or no longer enters) within the limit times, provided that this reconsideration does not contravene the limit times associated with the other requests. In a variant embodiment, the management of the processing of the requests can provide, for example in order to manage a request R1, if time and/or resources are available, for the insertion of a request R2 into the processing queue (on condition that the limit execution time of R1 is complied with).

In a sixth sub-step (optional), if the "SERVER FRONT END" is distinct from the "SERVER CORE", the "SEP SERVER" (or its "SERVER FRONT END" part) transmits the request R(i) to the "SERVER CORE". In a variant embodiment, the six sub-steps of the third step 630, the "SERVER FRONT END" manages the request/services correspondence and the execution of the services to the FMS instead of the "SERVER CORE". In this option, the "SERVER FRONT END", the "SERVER CORE" and the "SEP SERVER" corresponds to one and the same entity. In a seventh sub-step (optional), the "SEP SERVER" can interact with the functional cache. In this way, a part of the sub-steps are carried out in an autonomous manner (and rapidly) for a certain number of requests, for example on account of the making available of recurrent data and/or of data often requested by the clients. Monitoring of the requests can be performed on startup, or else by amassing the requests that are called in the course of time. If a request is asked frequently (or asked by several clients), the seventh sub-step then performs said request by itself, either periodically, or on event of the CORE. The data are made available in the fifth step and the subscriber CLIENTS can be advised of the update.

In one embodiment, the periodicity of the request, in the absence of events, can be effected according to a data obsolescence criterion. Such obsolescence parameters can be embedded on board the "SERVER BDD" for each unitary service and can be manifested by a duration ("timer") or another pertinent physical parameter (such as the evolution of the altitude or of the distance traveled for an airplane). The characteristic of functional cache can be applied to other services, for example to database consultations (and optionally supplemented with data sorting and filtering operations).

In a fourth step 640, the "SEP SERVER" commands the cores "CORE" to execute the requests. In a first sub-step, the "SEP SERVER" (or its "SERVER CORE" part) calls the various cores K(k) identified with their unitary services S(k,j) in the form of a batch of commands COM(S(k,j), n). Optionally, for parallelizable services in a multi-core environment, the calculated response time deducts the response times of the parallelizable services (for two parallelizable services, the time of the longer service is sliced). In a variant embodiment, the "SERVER FRONT END" is in charge of determining the parallelization and then transmits the order of the calculations and the list of cores in the form COM(S (k,j), n) to the "SERVER CORE". Optionally, in a "multi-core" environment, the "SERVER CORE" optimizes the response time by choosing the cores which respond the quickest, according to the Quality of Service in terms of required response time. In a variant embodiment, the "SERVER FRONT END" is in charge of reducing the response time by choosing the cores during execution. In a second sub-step, the "SERVER CORE" retrieves the data structures arising from the responses Rep_unitary(S(K,j), n) and stores them in a storage means Rep_CORE 512. In a third sub-step, the "SERVER CORE" advises the "SERVER FRONT END" when the batch of commands COM has terminated and makes available the result of the commands in Rep_CORE.

In a fifth step 650, the "SEP SERVER" processes the result of the requests. In the case of the use of a functional cache, a part of the steps can be avoided (in particular, by copying one or more previous results). In a variant embodiment, a result may or may not be associated with an expiry date. In a first sub-step, the "SEP SERVER" (or its "SERVER FRONT END" part) retrieves the structures made available by the third sub-step of the fourth step, in the base Rep_Core 512. In a second sub-step, the "SEP SERVER" (or its "SERVER FRONT END" part) retrieves the structures of responses expected by the client for the request R(i) in the table T_Rep. In a third sub-step, the "SEP SERVER" (or its "SERVER FRONT END" part) calculates the responses in the "Client" format Rep(R(i)) by applying the rules of the third sub-step of the second step. In a fourth sub-step, the "SEP SERVER" (or its "SERVER FRONT END" part) fulfills the data structure "Server Response for Ri" 511 and advises the client of the availability of the data of the response. In a fifth sub-step, the "SEP SERVER" (or its "SERVER FRONT END" part) is advised by the client that the request has finished being processed. If several clients are subscribers to the request, they are advised. In a sixth sub-step, the "SEP SERVER" 510 (or its "SERVER FRONT END" part 513) asks for the reinitialization of the base of the WRAPPER 514 and of the data structure "Server Response for Ri" 511.

Figure 7:
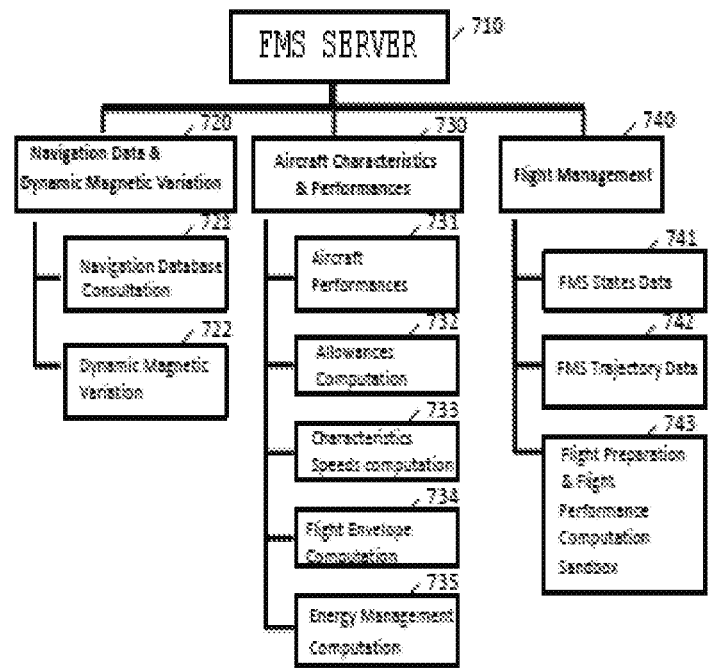
FIG. 7 schematically illustrates the structure and the functions of a flight management system of FMS type.

FIG. 7 schematically illustrates the structure and the functions of a flight management system (FMS). The method according to the invention advantageously applies to said FMS.

The FMS can be considered to be a "SERVER". According to the ATA architecture, the "flight management" or FMS forms part of the "navigation" and relates to chapters ATA 22 and ATA 34.

In the aeronautical sense, the navigation systems consider and ensure location (e.g. position, state, speed, etc.), "Flight Planning" (e.g. reference route, terminal procedures, waypoints, rolling, etc.), trajectory, guidance, piloting (algorithms making it possible to optimize the mission; choice of rerouting airports, etc.).

FIG. 7 schematically represents an FMS. In order to ensure its mission, the FMS is connected to numerous other processors (a hundred or so). In the architecture according to the method, the FMS as described hereinabove comprises an "FMS CORE" which makes available a list of unitary consultation/modification services and an "FMS SERVER" which carries out the tasks of the "SEP SERVER" of the method (e.g. mapping of the requests, isolation of the FMS CORE, piloting of the execution of the services of the FMS CORE, processing of the results etc.).

The FMS server 710 comprises for example unitary FMS services which can be classed into three main categories of service (AEEC ARINC 702A standard): 1) the services for consulting geographical data 720 ("navigation data & dynamic magnetic variation"), for example NAV DB 721 and MAG VAR 722, which allow the clients to search for geographical information (NAV DB) or magnetic declination on a point of the globe; 2) the services for consulting the performance of the airplane 730 ("aircraft characteristic & performances") involving TRAJ, PRED and PERF DB 731, allowances computation 732, characteristic speed computation 733, flight envelope computation 734, and energy management computation 735, for example; and 3) the services for "flight management" 740 for example consultation of the state of the airplane 741 (e.g. position, speed, states of the systems connected to the FMS, such as engine state, etc.), the consultation and modification of flight plan and trajectory 742 and the consultation and modification of the flight initialization data 743 (e.g. input of the takeoff speeds, of the cruising altitude, of the forecast weather, of the modes of fuel consumption, etc.).

Examples of "CLIENT" requests are described hereinafter.

Future operations in aircraft require (more and more) that third-party systems interact with the FMS, by using existing public services and/or by using existing private services (to be rendered public i.e. visible) and/or using new services to be implemented in the FMS. By way of example of such third-party systems, it is possible to cite for example a) the initialization of the FMS flight plan by an external processor (such as touch tablet or EFB for "Electronic Flight Bag"); b) the integration of the "flight plan" of the FMS with the "rolling plan" of the ground rolling processor; c) the optimization of the mission (for example called by a ground client (e.g. company tool for example) or aboard (e.g. tablet, EFB) via FMS calculation requests (alternatives of diversion FPLN flight plans, alternatives of FMS optimization parameters, alternatives of FMS initialization parameters e.g. test of masses on takeoff); d) the updating of the FMS software (in particular its Navigation databases, with 28-day cycle) by a third-party item of equipment (tablet, maintenance tool, EFB); e) the use of FMS requests by a system for monitoring the terrain of the traffic, of the weather to filter alerts, or to confirm them, or to optimize lateral and vertical adjustments (e.g.: avoidance of a mobile cloud mass detected by a Weather Radar) by systems such as TCAS, TAWS, GPWS, WxR or WIMS; f) the use of FMS requests to aid the triggering of events on a third-party system (e.g. RMS); g) the verification of conformity of the lateral and/or vertical trajectory calculated by the FMS, with respect to the digitized aeronautical maps provided to the crew (stored in a tablet, an EFB for example); h) the use of the FMS system to ascertain predictions over a given time horizon according to defined modes of flight conduct (guidance) and of airplane state; i) the interaction with the FWS (Flight Warning System); j) the passengers connected via their cabin interface (IFE for In Flight Entertainment), wishing to ascertain the predictions in terms of time, speed for their destination; k) the use of the FMS via a DIA (Domain Interaction Agent) or an integrated MSI (Man System Interface) which concentrates and organizes the exchanges between processors; l) the use of the FMS by any one of the clients hereinabove, including MMI and DATALINK to ascertain the local or predicted geographical data (waypoints, airports, radionavigation beacons); m) the interactions with MMI and DATALINK, etc.

Thus, a great diversity of new clients are able to interact with the FMS (EFB, WIMS, TCAS, TAWS, WxR, PA, FQMS, IFE), i.e. most systems according to the various ATAs. Moreover, two additional categories of clients customarily interact with the FMS system: the Man Machine interfaces (MMI) which allow the operators (crew) to interact with the FMS and the so-called CMU (for "Communication Management Unit") interface which allows a ground operator (company, air traffic control) to interact with the FMS. This CMU processor is for example a client of the FMS data and it can ask for modification of the mission (i.e. insert "revisions" into the FMS).

The term "interaction" is intended to mean the dispatching of a request to the FMS, with an expected return, as opposed to the term "information" which corresponds to the fact of the third-party systems subscribing to the data issued periodically—or on event—by the FMS.

Certain requests correspond to unitary services ("as 1 for 1"). For example: a request for retrieval of the airports around the airplane, corresponding to a "Get_Airport" unitary service of the navigation database consultation service; a request for inserting a company Route in the AEEC ARINC 424 format, for example, for a client is also an "INSERT_COROUTE" unitary service offered by the "Flight Preparation" part; a request for consulting the airplane state (current fuel for example) corresponds to a Get_current_Fuel unitary service offered by the "Aircraft States" part); a request for consulting the current flight envelope of the airplane corresponds to a Get_flight_envelope unitary service offered by the "Flight envelope Computation" part.

More complex requests can generate "batches" (or sequences or sets or collections, ordered or not, prioritized or not) of requests. For example an "INSERT FPLN" request to insert a flight plan by separate elements, such as performed currently by the DATALINK services for the companies (AOC) and control centers (ATC), defined in the ARINC 702A standard for AOC and D0258 standard for ATC can comprise or correspond to a plurality of requests and/or of parameters associated with these requests. The insertion of a complete flight plan can correspond to an "INSERT FPLN" request which generally comprises the following parameters: a) elements making it possible to calculate the route to be followed (e.g. airports, takeoff procedures, etc.), b) elements for initialization of the flight plan, making it possible in addition to carry out the trajectory calculations and predictions (e.g. cruising level, mass envisaged on takeoff, etc.) and c) environment elements on the flight plan (e.g. weather forecast along the flight plan, barometric setting etc.). The INSERT FPLN client request can comprise a set of parameters, sometimes in an undifferentiated manner. The role of the SERVER will then be to determine the unitary services to meet the request and the order in which the commands must be processed.

In a conventional FMS, constraints exist in regard to scheduling of the various unitary services (e.g. insertion of the departure procedure only after having inserted the departure airport). Certain FMSs, on account of their architecture and their design, have counter-intuitive rules (certain FMSs authorize for example unitary services for inserting a departure airport only, then the inserting of other elements while yet other FMSs require insertion of the departure airport AND the arrival airport before any other insertion of lateral and vertical elements, etc.). Likewise, certain FMSs authorize the inputting of initialization elements without having input any route, whereas others require it beforehand. Certain FMSs make it possible to string together unitary services for inserting the airways, and automatically carry out the management of the crossovers between two successive airways while others prohibit it, etc.

Advantageously, the SEP SERVER makes it possible to adapt and to manage the unitary commands in the right order, so as to respond to the requests. The SEP SERVER can also perform comparisons between the various alternatives, for optimization purposes. For example, a complex request can consist in comparing the rerouting alternatives along the flight plan. Each "rerouting" constitutes a fully-fledged flight plan. The role of the SEP SERVER will then be to string together the requests of this type as requests of "INSERT FPLN" type for each rerouting alternative, each request of "INSERT FPLN" type giving rise to a batch of unitary services such as is proposed in the previous example.

At output, the fifth sub-step of the fourth step can use logical operators to perform such comparisons (for example predicted time and predicted fuel at arrival, search for better flight level as a function of the weather, etc.).

The periodic updating of information in the form of a functional cache can take into account the position of the airplane (update when this position alters according to predefined thresholds) and/or at predefined time intervals (regular, periodic, etc.).

Figure 8:
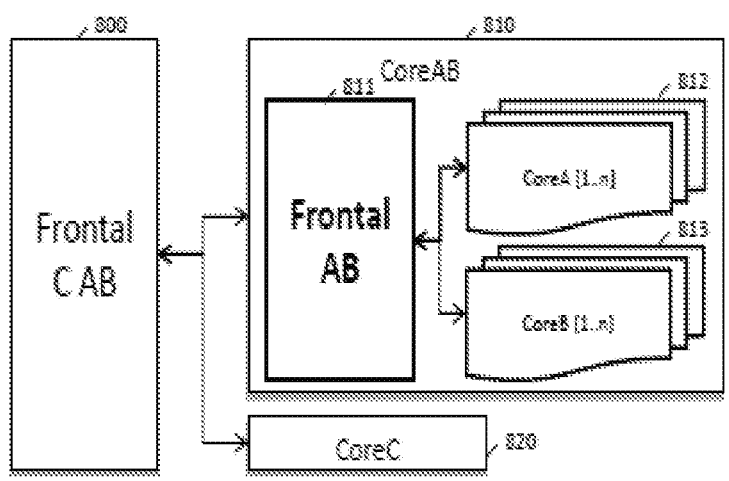
FIG. 8 illustrates examples of variant embodiments of the invention.

FIG. 8 illustrates examples of variant embodiments of the invention. The interactions between the elements of the architecture can be unidirectional or bidirectional. The various graphs corresponding to the various possible architectures can be oriented, ordered, open, closed, cyclical, acyclical, connected etc. In particular, the various frontal servers and/or the calculation cores can be interacting in various ways, for example directly or indirectly. In a particular variant embodiment, a FRONTAL server C AB 800 can call another FRONTAL server AB 811, which can thereafter address several cores 812 and 813 of core AB 810 for example. The FRONTAL C AB 800 therefore addresses the cores 812 and 813 indirectly. The frontal C AB 800 can also be interacting directly with a CORE C 820. In a variant embodiment, a FRONTAL server can be common to several cores. Conversely, in a variant embodiment, one and the same core can be addressed by several servers of FRONTAL type. More generally still, some parts of the graph or circuits can be redundant, so as to obtain robust and/or reactive distributed systems.

In one embodiment, a SERVER comprises several entities or applications chosen from among the list comprising FMS, MMI, MSI, DIA, CMU, TCAS, TAWS, WIMS, WxR, EFB, tablet, FQMS, PA, FWS, IFE, TAXI or a dedicated generic partition and a CLIENT can comprise an entity or an application other than the (i.e. different from the) SERVER.

In one embodiment, a SERVER can comprise one or more of the applications chosen from among NAV DB, PERF DB, FPLN, TRAJ, PRED, GUID, LOCNAV, DATALINK or the MMI and a CLIENT can comprise an entity or an application other than the (i.e. different from the) SERVER.

Embodiments are described hereinafter.

There is disclosed a method for the management of the flight of an aircraft implemented by computer within a flight management system or FMS, the method comprising the steps consisting in receiving a request issued by at least one client; determining a correspondence between the request and one or more predefined unitary services executable by at least one server associated with said FMS; queuing the unitary service or services determined in one or more queues; determining a response time associated with the request; and notifying said at least one client of the response time.

The method according to the invention defines a system consisting in segmenting a request into several unitary parts or portions or sub-requests or requests (e.g. with or without overlap) each corresponding to flight management unitary services (e.g. ATA services, c.f. hereinafter). The unitary services are parallelized, i.e. are placed in queues. On the basis of this distributed system, a response time associated with the client's request is determined (according to various techniques, c.f. hereinafter). The client is notified or informed of processing of its request according to various modalities (e.g. actual existence of the processing and/or predictable duration and/or actual duration and/or duration and level of quality of service etc.).

The definition of unitary services (i.e. terminal granularity, "atomic" level) generally makes it possible to pool and/or merge and/or to simplify and/or to aggregate requests emanating from various clients. In this case, the downstream calculations are in fact optimized or at least optimizable (e.g. placing them in cache may reduce the calculations). It is generally possible to pool the processing resources and/or the inputs. Stated otherwise, it is possible to pool the supply i.e. the calculation resources and equally well to pool the demand i.e. by assimilating requests, in whole or in part. Specifically, the requests can be allocated in an optimal manner over the hardware resources available (e.g. various calculation cores), for example so as to smooth or apportion the loading.

In a development, the step consisting in determining a response time comprises a step consisting in determining the processing time of each unitary service, the processing time of a unitary service being dependent on the occupancy of one or more queues.

In one embodiment, a theoretical or simulated time can be calculated or simulated. In one embodiment, the actual response time, i.e. ensuing from measurements conducted on the calculation cores, can be determined. Depending on the embodiments, the determination of the response time may be different. For example, the response time may be dependent on i) the processing time of the unitary services Sj (for example retrieved from the "SERVER BDD") and on ii) the occupancy of the processing queue T by requests currently undergoing execution. More generally, within a distributed system (elements implemented in parallel), the estimation of the response time may depend on the processing queue for the requests currently undergoing execution. In a variant, the "SERVER FRONT END" calculates the response time of the request on the basis of the processing time of the unitary services Sj (retrieved from the "SERVER BDD") and of the occupancy of the processing queue T by requests currently undergoing execution. The "SERVER CORE" receives the services to be executed S(i,j) from the FRONTAL and their associated processing queue, and the cores K on which to execute the services Si.

In a development, the method furthermore comprises a step consisting in executing said unitary services determined.

The "SEP SERVER" can control the execution of the "Services" S(i,j) at the "CORE", on said processing queue T, via the commands COM(S(i,j),n).

In a development, the method furthermore comprises a step consisting in communicating a response to a client, said response comprising the results of the execution of the unitary services.

In a development, at least one client is associated with a processing priority.

QoS schemes may exist with or without the management of priorities associated with the clients. Some clients may exhibit predefined priorities, for example default priorities, others may never be associated with such priorities, yet others may be allocated priorities in the course of time (for example, as a function of the waits already elapsed, as a function of the criticality of the client within the overall systemic perspective, etc.).

In a development, the step consisting in determining a correspondence between said request and one or more predefined unitary services and/or the step consisting in queuing the unitary service or services determined in one or more queues and/or the step consisting in executing said unitary services determined is dependent on the priority associated with said client.

If appropriate, the priority associated with a client (e.g. predefined, determined or allocated) can influence a certain number of steps of the method: a priority can for example modify the processing within a queue (e.g. request by "doubling up" another or by interrupting another etc.). Alternatively or cumulatively, a priority can steer or influence the execution of one or more unitary services (e.g. more or less extended level of precision). In particular, the scheduling of execution of the unitary services can be controlled (entirely or partially) by priority parameters associated with the clients (if appropriate). Still alternatively or cumulatively, a priority can determine or influence the partition of an initial request into a bundle of unitary requests (the granularity may optionally be dependent on the criticality of the client in the overall system, this criticality being partially reflected or "contextualized" via the priority level, at least in certain embodiments).

In a development, a priority is dynamic.

The priority parameters can be predefined entirely or in part. They may be static (that is to say for example invariant over time) or dynamic (that is to say for example dependent on the overall loading of the system of systems, dependent on the arrival of new clients etc.).

In one embodiment, the "SEP SERVER", for example implementing the determination of the unitary services in correspondence with the request initially received and the queuings, is configured by establishing notably one and/or the other of the following analyses: i) the characteristics in terms of quality of unitary service of the services offered by the "CORE", ii) the correspondence between the requests of the "CLIENTS" and the unitary services of the "CORE" or of the "COREs" suitable for executing them; iii) the correspondence between the results of the unitary services of the "CORE" and the results expected by the client; iv) the scheduling of the requests of the various "CLIENTS" on the "CORE" or on the "COREs" suitable for processing them; v) the management of a functional cache to preserve the results estimated as potentially reusable over a long duration.

In a development, a priority associated with a client is furthermore associated with an absolute maximum number of requests and/or a maximum number of requests for a predefined time interval and/or parameters in regard to precision and/or reliability of execution of the unitary services.

The management of the quality of service (viewed by means of the transformation of the initial request into a plurality of unitary service, of the management of the queues, etc.) may be static or else dynamic (that is to say altering over time). Moreover, this quality of service may be controlled or controllable according to diverse modalities (it may notably be configured and/or configurable).

According to one aspect of the invention, the management of the quality of service can be refined according to various modalities. For example, within the framework of the prioritization of certain clients with respect to others, a certain number of extra parameters can be taken into account. For example and optionally, the management of the QoS (for example through the management of a table or matrix defining or associated with this QoS) can take into account the characteristics (or parameters) in regard to RAM/ROM memory and processor loading (for example of the core for a service S(ki,j). Still optionally, such a QoS table can comprise the characteristics in regard to calculation precision, or else indeed characteristics relating to the reliability of the calculation.

According to another aspect of the invention, the "SEP SERVER" comprises a storage means (SERVER BDD), which determines the number of requests "R_max" acceptable as input, a list of requests "R(i)", the response structure Rep(R(i)) for each request R(i), the response time required (deadline) "T_R(i)" by request "R(i)", the list of cores "K(i)" drivable by the server, the list of services "S(*,j)" offered, the typology of the services offered (list of the cores which offer the service, parallelizable, sequential, order), the QoS of each unitary service of the core and the execution times of the CORE k(i): Tu(Si, Kj), and of the server SERVER: Tu(Ri, Server) (formatting of the data, processing times internal to the server etc.). The SERVER BDD comprises the correspondence matrix REQ_SERV of the unitary services corresponding to each Request. The SERVER BDD determines a correspondence between the processing times of the Services S(*,j) and the processing times of the requests R(i), on the basis of the correspondence table REQ_SERV. It is stressed that the calculation T(Ri)=f(T(S1), . . . , T(Sn)) is not a simple sum (having regard to the parallelizable processings).

According to one aspect of the invention, a client "fixed-price contract" mechanism may be implemented (e.g. for example analogous to the operation of a capped fixed-price telephone contract): if a client has consumed all their requests over a given time, a denial notification can be issued. Optionally, a variant embodiment can implement a mechanism for filtering the clients that over-consume the service by considering one or more predefined thresholds). For example, if a client makes more than N requests over a given time interval, one or more denial notifications can be issued. Optionally, in a variant embodiment, if the maximum number of requests that can be managed or dealt with by the "SEP SERVER" is reached (621—stack of requests R1, . . . Rmax), the request R(i) can be denied.

In certain embodiments, the "SEP SERVER" system 510 is an adaptive system, according to various schemes. It can be configurable "at design time", at "start time" and/or "at runtime". The expression "at design time" signifies that the number of clients, the times as well as the associated services are determined at the moment of design. This approach exhibits limitations in terms of possibilities of maintenance and of upgradability. The expression "at start time" signifies that on startup the system reads a configuration table, for example "SERVER BDD" which describes the topology of present clients, and reads the list of "CORE" services available (with their characteristics). The expression "at runtime" signifies that the method furthermore comprises one or more steps aimed at satisfying one or more clients and/or the associated adaptation mechanisms (for example in real time).

In a development, the request and/or one or more queues is associated with one or more cachings.

According to one embodiment, the caching can occur before or after the queuing. The caching can relate to the client's (initial) request and/or the unitary requests derived from said initial request (the granularity of the caching can be variable). The caching can also relate to the execution of the unitary services. A plurality of caches can exist (for example of different kinds or else of the same kind for reasons of redundancy and speed of access). In one embodiment, the "SERVER FRONT END" makes requests to the "SERVER CORE" in the absence of any client request, to manage a functional cache.

In a development, the caching is predictive.

Use can be made of the consultation of a "functional cache": if the item of data expected by the client is available and still valid, the other steps are not carried out and the method can continue directly.

In one embodiment, the functional cache is a "predictive cache": it contains data calculated periodically by the "SEP SERVER" (without being invoked by a client, i.e. in the absence of a client request, for example as a function of the analysis of the recurrent requests).

In a development, the cache (the caching) is of historization.

The functional cache can be a "historization cache": it can preserve in memory certain results of already executed requests, as long as they are not obsolete, so as to immediately be able to return the result to a client that might make the same request a little later. Stated otherwise, the results of a request are stored to a certain extent in the case where another client (or the same) remakes an equivalent request, and when the results are still valid. As a function of the context, the data manipulated in the cache will for example be able to be data comprising recurrent requests of the same type (offline or online), data relating to the flight phase, data relating to the equipment connected, data relating to the dynamics of the airplane, data relating to the state of the systems, data relating to the obsolescence of these same data etc.

In a development, the processing of one or more queues can be interrupted and/or resumed.

In an aspect of the invention, the processings of the requests by the CORE on a processing queue T can be interrupted and then resumed ("Pause/Resume"). The triggering of such interruptions or resumptions in the queues can be controlled by diverse entities. In one embodiment, control is centralized (e.g. by one or more queues, i.e. a unit in charge of scheduling the calculations). In other embodiments, control is distributed: the client-server model (e.g. "master-slave") can be rendered more sophisticated to the extent that at least some clients can interact with one another (competition, coopetition, etc.), for example via the queues and/or the management of the priorities. Finally, embodiments can be hybrid and comprise in parts centralized controls while other controls result from the emergence of parts of the system interacting with one another. The criteria behind or causing these interruptions and resumptions can also be diverse; they can notably take into account the priorities associated with the clients or be commanded by a "dispatcher" operating according to predefined rules.

In a development, the response to the request of a client is formatted according to a format adapted for said client from the formats associated with the unitary services.

The response to the request comprises the results of the execution of the unitary services. These unitary services being "isolated" or decoupled from the evolution of the clients, the raw data provided by the "core" services must generally be reprocessed (or modified or translated or manipulated or transformed or supplemented or filtered) so as to meet the needs of the clients.

According to one aspect of the invention, the "SERVER FRONT END" can format or "reformat" i.e. "translate" the response Rep(Ri) to the request R(i), on the basis of the structures Rep_units(S(*,j)) retrieved from the "SERVER CORE" during the execution of the services S(*j).

The operation of "reformatting" or more generally of "translation" can notably comprise diverse logical operations (e.g. conversions of units or of data, data merges, arithmetic operations, the application of algorithms or of rules etc.).

For example, an EFB (client) may wish to ascertain the best route from among a set of N routes, with the fuel consumed and the time necessary to reach the known destination as criteria. The EFB client interrogates the FMS "CORE" via the "SERVER" by dispatching its N Routes. The "SERVER FRONT END" takes its request into account. The "SERVER CORE" uses the services of the "CORE" and returns N routes using the "FLIGHT PREPARATION" service; this service makes it possible to insert a route into the FMS. Next, for each of the routes, the "SERVER FRONT END" retrieves from the "Response Core" the raw response of the service in the format of the "CORE", namely a 3D trajectory containing the 2D segments (ground trace) and the predictions in terms of altitude, speed, time of transit, weather and fuel on each element of the route. In order to allow the client to compare the alternatives (e.g. ranking of the routes by fuel and time), the "SERVER FRONT END" extracts the data for each of the routes, and creates an array containing for each route the fuel consumed and the time to reach the destination.

In a development, a request is associated with a response time objective and/or a limit response time.

The request issued by a client can be accompanied by an item of information relating to the processing constraint (e.g. "what the client wishes", optimal timescale) and/or to the future acceptability of a response (e.g. "what the client accepts in return", maximum timescale). Generally, according to an aspect of the invention, the acceptability of a new request R(i) can be determined, on the basis of the response times of the request R(i), compared with a response time objective. In one embodiment, by determining one or more response times below (or above) one or more predefined thresholds, it is also possible to effectively process the small "queues" (for example if the priorities are equivalent).

A calculation time objective is determined so as to be able to respond to the clients a given response time (the server being able to be called by multiple clients, and being able likewise to perform its own calculations). Said response time objective can be determined by the client and/or be determined by the server.

In a development, several requests received are determined as being at least partially identical.

The requests at input can be totally identical (identical or quasi-identical requests) or partially redundant (considering the unitary services in correspondence).

Requests can be determined as identical (e.g. binary copy), similar (e.g. identical as regards their essential characteristics, i.e. different on non-critical points), "equivalent" (i.e. interpreted as such according to a predefined model, e.g. functionally equivalent).

In certain very particular embodiments, it may however sometimes happen that one and the same request is transformed into sets of unitary services which may be different. Accordingly, the possibilities for pooling several requests may get modified.

In a development, the priority associated with a client results from a voting mechanism.

In one embodiment, the clients and/or the servers behave as a peer-to-peer network. In particular, the priority allocated to each node can "emerge" subsequent to negotiations conducted in and by the network.

In a development, one or more queues are distributed queues.

In one embodiment, the management of a queue is performed according to the principle of "First In, First Out" (FIFO). In regard to queuing, distributed architectures can also be implemented (e.g. "distributed queues"). The scheduling rules can then comprise algorithms for "priority queuing" (priority to certain types of traffic, allowing traffic of low priority to pass only if there is no longer any traffic of high priority), for "custom queuing" (according to weighted Round-Robin algorithms, aimed for example at forwarding client requests, in turn, while allowing more time to the priority packets) or else indeed for "fair queuing" (e.g. successively and equitably allotting the clients a possibility of forwarding their requests), etc. . . . .

In a development, at least one client can cancel a request.

In one embodiment, a client can contribute to the economy of the core services if it turns out that it is no longer in need of a result (e.g. it can intentionally lighten the downstream calculations and the core services can be adapted for the recognition of such commands for ending or withdrawing requests).

In a development, a client can authenticate itself (e.g. strong authentication). In a secure embodiment of the invention, accesses to the core services can be encrypted and/or authenticated.

In a development, the server is associated with a flight management system or FMS.

The FMS SERVER comprises a "SERVER CORE" which receives the requests from the FRONTAL and their associated processing queue, and the cores K on which to execute the services Sj. The "SERVER CORE" associates with each client request the list of "FM services", on the basis of the correspondence table which matches a client request and a list of "FM SERVICES". The "SERVER CORE" commands the execution of the "FM Services" COM(S(*,j), n) at the "FM CORE" on said processing queue T. The "SERVER CORE" provides the "SERVER FRONT END" with the results Rep_init(S(*,j)) of the execution of the "FM SERVICES".

In a development, a unitary service being an avionics service of ATA type (characteristic of system and of method).

There is disclosed a computer program product, said computer program comprising code instructions making it possible to perform one or more steps of the method when said program is executed on a computer.

There is disclosed an avionics system for managing the flight of an aircraft comprising means for executing one or more of the steps of the method.

In a development, the system comprises at least one server (CORE) associated with the flight management system FMS and at least one server of clients (SEP SERVER), said at least one server (CORE) associated with the FMS comprising calculation units or cores, each calculation unit or core being able to execute a plurality of unitary services, and said at least one server of clients (SEP SERVER) being able to receive one or more requests issued by one or more clients.

In a development, the server of clients (SEP SERVER) comprises a frontal server (FRONTAL) receiving the unitary services and determining the processing queues for the unitary services and furthermore comprising a calculation server (CORE) for executing said unitary services.

In a development, said server (CORE) interrogates a database server (SERVER BDD) which comprises the list of unitary services per calculation unit.

In a development, a unitary service is an avionics service of ATA type.

The present invention may be implemented on the basis of hardware elements and/or software elements. It may be available as a computer program product on a computer readable medium. The medium may be electronic, magnetic, optical or electromagnetic. The computing means or resources may be distributed ("Cloud computing").

The invention claimed is:

1. A method for managing a flight of an aircraft in an avionics system,
said avionics system comprising:
at least one server (CORE) associated with a flight management system (FMS) and at least one server of clients (SEP SERVER), said at least one server (CORE) associated with the FMS comprising calculation units or cores, each calculation unit or core being able to execute a plurality of unitary services, and said at least one server of clients (SEP SERVER) being able to receive one or more requests issued by one or more clients;
the at least one server of clients (SEP SERVER) comprising a frontal server (FRONTAL) receiving the unitary services and determining processing queues for the unitary services and furthermore comprising a calculation server associated with the flight management system for executing said unitary services;
said at least one server (CORE) interrogating a database server (SERVER BDD) which comprises a list of unitary services per calculation unit,
said method comprising the steps of:
receiving a request issued by at least one client;
determining a correspondence between the request and one or more predefined unitary services executable by at least one server associated with said FMS;
queuing the unitary service or services determined in one or more queues; determining a response time associated with the request; and
notifying said at least one client of the response time;
a step consisting in determining a response time comprising a step consisting in determining a processing time of each unitary service, the processing time of a unitary service being dependent on occupancy of one or more queues, wherein:
at least one client being associated with a processing priority; and
the step consisting in determining a correspondence between said request and one or more predefined unitary services and/or a step consisting in queuing the unitary service or services determined in one or more queues and/or a step consisting in executing said unitary services determined being dependent on the processing priority associated with said client;
wherein a priority associated with a client being further associated with an absolute maximum number of requests and/or a maximum number of requests for a predefined time interval and/or parameters in regard to precision and/or to reliability of execution of the unitary services.

2. The method according to claim 1, further comprising a step consisting in executing said unitary services determined.

3. The method according to claim 2, further comprising a step consisting in communicating a response to a client, said response comprising results of the execution of the unitary services.

4. The method according to claim 1, wherein a priority is dynamic.

5. The method according to claim 1, wherein the request and/or the one or more queues being associated with one or more cachings.

6. The method according to claim 5, wherein a caching is predictive.

7. The method according to claim 5, wherein a caching comprises a historization.

8. The method according to claim 1, wherein the execution of said unitary service being able to be interrupted and/or resumed.

9. The method according to claim 1, wherein a request is associated with a response time objective and/or a limit response time.

10. The method according to claim 1, wherein several requests received being determined as being at least partially identical.

11. The method according to claim 1, wherein the processing priority associated with a client resulting from a voting mechanism.

12. The method according to claim 1, wherein one or more queues being distributed queues.

13. The method according to claim 1, wherein a client is able to cancel a request.

14. The method according to claim 1, wherein a client is able to authenticate itself.

15. The method according to claim 1, wherein a unitary service being an avionics service of an Air Transport Association (ATA) type.

16. A computer program product, said computer program product comprising non-transitory computer code instructions to perform the steps of the method according to claim 1, when said non-transitory computer code instructions of said computer program product are executed on a computer.

17. A method for managing a flight of an aircraft in an avionics system, the method comprising:
implementing an avionics system comprising:
at least one server (CORE) associated with a flight management system (FMS) and at least one server of clients (SEP SERVER), said at least one server (CORE) associated with the FMS comprising calculation units or cores, each calculation unit or core being able to execute a plurality of unitary services, and said at least one server of clients (SEP SERVER) being able to receive one or more requests issued by one or more clients;
the at least one server of clients (SEP SERVER) comprising a frontal server (FRONTAL) receiving the unitary services and determining processing queues for the unitary services and furthermore comprising a calculation server associated with the flight management system for executing said unitary services; and
said at least one server (CORE) interrogating a database server (SERVER BDD) which comprises a list of unitary services per calculation unit,
receiving a request issued by at least one client;
determining a correspondence between the request and one or more predefined unitary services executable by at least one server associated with said FMS;
queuing the unitary service or services determined in one or more queues; determining a response time associated with the request; and
notifying said at least one client of the response time; and
determining a response time comprising a step consisting in determining a processing time of each unitary service, the processing time of a unitary service being dependent on occupancy of one or more queues, wherein:
at least one client being associated with a processing priority; and
the step consisting in determining a correspondence between said request and one or more predefined unitary services and/or a step consisting in queuing the unitary service or services determined in one or more queues and/or a step consisting in executing said unitary services determined being dependent on the processing priority associated with said client, wherein a priority associated with a client being further associated with an absolute maximum number of requests and/or a maximum number of requests for a predefined time interval and/or parameters in regard to precision and/or to reliability of execution of the unitary services.

18. The method according to claim 17, further comprising a step consisting in executing said unitary services determined.

19. The method according to claim 18, further comprising a step consisting in communicating a response to a client, said response comprising results of the execution of the unitary services.

20. The method according to claim 17, wherein a priority is dynamic.

21. The method according to claim 17, wherein the request and/or the one or more queues is associated with one or more cachings; wherein a caching is predictive; wherein a caching comprises a historization; wherein the execution of said unitary service being able to be interrupted and/or resumed; wherein a request is associated with a response time objective and/or a limit response time; wherein several requests received being determined as being at least partially identical; wherein the processing priority associated with a client resulting from a voting mechanism; wherein one or more queues being distributed queues; wherein a client is able to cancel a request; wherein a client being able to authenticate itself; and wherein a unitary service being an avionics service of an Air Transport Association (ATA) type.

22. A computer program product, said computer program product comprising non-transitory computer code instructions to perform the steps of the method according to claim 17, when said non-transitory computer code instructions of said computer program product are executed on a computer.

* * * * *